(12) United States Patent
Bess

(10) Patent No.: US 7,731,221 B2
(45) Date of Patent: Jun. 8, 2010

(54) COLLAPSIBLE AND PORTABLE WHEELED DOLLY PARTICULARLY SUITABLE FOR USE BY STUDENTS OR OTHERS IN THE TRANSPORT OF ITEMS

(76) Inventor: Suzan L. Bess, 4358 S. Custer, Monroe, MI (US) 48161

( * ) Notice: Subject to any disclaimer, the term of this patent is extended or adjusted under 35 U.S.C. 154(b) by 210 days.

(21) Appl. No.: 11/843,442

(22) Filed: Aug. 22, 2007

(65) Prior Publication Data

US 2008/0073880 A1    Mar. 27, 2008

Related U.S. Application Data

(60) Provisional application No. 60/826,397, filed on Sep. 21, 2006.

(51) Int. Cl.
*B62B 3/02* (2006.01)
(52) U.S. Cl. .................. 280/651; 280/30; 280/638; 280/639
(58) Field of Classification Search .............. 280/30, 280/35, 38, 39, 42, 43, 47.18, 47.24, 47.26, 280/47.34, 47.35, 47.371, 47.38, 79.3, 638, 280/639, 640, 641, 642, 643, 644, 648, 651, 280/654, 655; 108/159
See application file for complete search history.

(56) References Cited

U.S. PATENT DOCUMENTS

| | | | | |
|---|---|---|---|---|
| 1,828,780 | A | * | 10/1931 | McKnight .................. 108/173 |
| 3,368,504 | A | * | 2/1968 | Cohen ........................ 108/131 |
| 3,931,985 | A | | 1/1976 | Knebel |
| D245,971 | S | | 10/1977 | Martens |
| 4,253,677 | A | | 3/1981 | Wissler |
| 4,323,260 | A | | 4/1982 | Suchy |
| 4,326,731 | A | | 4/1982 | Woychio et al. |
| 4,337,966 | A | | 7/1982 | Stevens |
| 4,339,141 | A | | 7/1982 | Thiboutot et al. |
| 4,343,487 | A | | 8/1982 | Crothers |
| D284,416 | S | | 6/1986 | Smith |
| D292,135 | S | | 9/1987 | Grube et al. |
| 4,765,644 | A | | 8/1988 | Bell et al. |
| 4,878,682 | A | | 11/1989 | Lee |
| 5,201,536 | A | * | 4/1993 | Bono et al. .................. 280/30 |
| 5,265,892 | A | * | 11/1993 | Said ............................ 280/30 |
| 5,485,655 | A | * | 1/1996 | Wang .......................... 16/371 |
| 5,544,864 | A | * | 8/1996 | Gabriel-Lacki et al. ....... 256/25 |
| 5,738,365 | A | | 4/1998 | McCarthy |

(Continued)

*Primary Examiner*—Glenn Dayoan
*Assistant Examiner*—Brodie Follman
(74) *Attorney, Agent, or Firm*—Gifford, Krass, Sprinkle, Anderson & Citkowski, P.C.

(57) ABSTRACT

A collapsible and transportable dolly including first and second rigid base portions hingedly secured together at a central location. First and second pairs of wheels secure to underside locations associated with the base portions. First and second substantially rectangular and frame shaped end supports secure in upwardly extending fashion to opposite end locations of the hingedly connected base portions and first and second pairs of top brackets secure in interconnecting and hinged fashion between the end supports, and such that associated angled bracket portions extend from end locations of each of the top brackets and telescopically engaging the end supports. In this fashion, the dolly is converted from a use to a folded storage/transport position by folding the base portions upwardly about the central hinged connection, concurrent with inwardly and downwardly folding the top brackets concurrent with telescoping the angled brackets along end support channels.

20 Claims, 17 Drawing Sheets

U.S. PATENT DOCUMENTS

| | | |
|---|---|---|
| 5,772,236 A | 6/1998 | Clark |
| 5,806,864 A | 9/1998 | Zielinski et al. |
| 5,915,722 A | 6/1999 | Thrasher et al. |
| 5,915,723 A | 6/1999 | Austin |
| D415,600 S | 10/1999 | Hsieh et al. |
| 6,042,128 A | 3/2000 | Dinkins |
| 6,055,999 A * | 5/2000 | Grey .................. 135/147 |
| 6,073,943 A * | 6/2000 | Serrault ............ 280/47.26 |
| 6,145,801 A * | 11/2000 | Herring, Jr. ........... 248/463 |
| 6,295,669 B1 * | 10/2001 | Saus ..................... 5/116 |
| 6,471,236 B1 | 10/2002 | Eskridge |
| 6,491,318 B1 | 12/2002 | Galt et al. |
| 6,581,945 B1 * | 6/2003 | Shapiro ................ 280/30 |
| 7,201,385 B2 * | 4/2007 | Renz et al. ......... 280/79.11 |
| 7,360,783 B2 * | 4/2008 | Home ................. 280/639 |
| 7,377,538 B2 * | 5/2008 | Stuart et al. .......... 280/651 |
| 7,490,847 B2 * | 2/2009 | Dahl .................. 280/638 |
| 2002/0158446 A1 * | 10/2002 | Stravitz et al. ........ 280/651 |
| 2005/0241552 A1 * | 11/2005 | Neunzert et al. ....... 108/159 |

* cited by examiner

COLLAPSIBLE AND PORTABLE WHEELED DOLLY PARTICULARLY SUITABLE FOR USE BY STUDENTS OR OTHERS IN THE TRANSPORT OF ITEMS

CROSS REFERENCE TO RELATED APPLICATIONS

The present application claims the priority of U.S. Provisional Patent Application Ser. No. 60/826,397, filed Sep. 21, 2006, and entitled Collapsible and Portable Wheeled Dolly Particularly Suitable for use by Students or Others in the Transport of Items.

BACKGROUND OF THE INVENTION

1. Field of the Invention

The present invention relates generally to a collapsible and portable wheeled dolly or cart. More specifically the present invention discloses a collapsible dolly assembly suitable for being transported in a confined space, e.g. vehicle trunk, in a first storage position, and quickly converted to a wheel supported and three-dimensional space supporting use position to transport a plurality of items, such as those as which are associated with students or other individuals moving to a certain location, and by which it is desirable to be able to transport a number of items in a single trip.

2. Description of the Prior Art

The prior art is well documented with examples of foldable or convertible carts. The purpose of such convertible and wheel supported devices is to assist a user in quickly and conveniently transporting articles as a preferred alternative to carrying such items.

A first example of a collapsible cart is set forth in U.S. Pat. No. 5,806,864, issued to Zielinski et al., and which exhibits four vertical legs with a plurality of shelves mounted thereupon. The shelves are rotatable relative to the legs and foldable about a middle thereof and so that the cart may be alternated between open/operable and closed/storage conditions. A plurality of locks stabilize the cart in the open position.

U.S. Pat. No. 5,915,723, issued to Austin, teaches a collapsible utility cart including a frame having an upper pivotal component, a lower pivotal component and side components positioned therebetween, for converting the frame between extended and collapsed orientations. The frame further has wheels disposed in the corners thereof and an inner basket is dimensioned to be secured within the frame. A locking component is provided for locking the frame in the collapsed orientation and a telescopic handle is further pivotally coupled to the frame.

U.S. Pat. No, 5,738,365, issued to McCarthy, teaches a collapsible cart including a base member, first and second double L-shaped brackets, a pair of locking pins, and two locking bar members. The locking bar members and locking pins are utilized to lock the double L-shaped brackets into place when the cart is in the un-collapsed configuration.

A yet further example of a foldable laundry cart is disclosed in U.S. Pat. No. 5,772,236, issued to Clark, and in which a frame assembly includes an opening in which is fitted a basket. First and second leg assemblies are pivotally attached to opposite ends of the frame assembly, wherein the leg assemblies are foldable toward each other to a horizontal position adjacent the underside of the frame assembly whereby the cart can be easily stored when not in use. A tray assembly is swivelly attached to the frame assembly above the opening and a handle assembly extends from each end of the frame assembly wherein the handle assembly is adapted for use as a handle and a clothes hanging device.

SUMMARY OF THE PRESENT INVENTION

The present invention discloses a collapsible and transportable dolly and which includes first and second rigid and substantially planar base portions hingedly secured together at a central location. First and second pairs of wheels secure to underside locations associated with the base portions in foldable fashion between inward/stowed and downward/deployed fashion.

First and second substantially rectangular and frame shaped end supports secure in upwardly extending fashion to opposite end locations of the hingedly connected base portions and first and second pairs of top brackets secured in interconnecting and hinged fashion between the end supports. Associated angled bracket portions extend from end locations of each of the top brackets and telescopically engage the end supports.

In this fashion, the dolly is converted from use to folded storage/transport positions, such as by folding the base portions upwardly about the central hinged connection, concurrent with inwardly and downwardly folding the top brackets and further concurrently with telescoping the angled brackets along the end support channels.

Additional features include the first pair of wheels including swivelable wheels secured to a first end of the dolly, whereas the second pair of wheel further comprising fixed wheels secured to a second end. A lock release mechanism is associated with each of the fixed and swivelable wheels and, in cooperation with a support pin associated with wheel housings, permits the wheels to convert between use and rotated storage positions within a selected base portion underside. Mesh netting supports secure to respective sides and ends of the assembled dolly enclosure and assist in retaining of contents held within the supporting and defined interior.

BRIEF DESCRIPTION OF THE DRAWINGS

Reference will now be made to the attached drawings., when read in combination with the following detailed description, wherein like reference numerals refer to like parts throughout the several views, and in which.

DETAILED DESCRIPTION OF THE PREFERRED EMBODIMENTS

Figure 1:
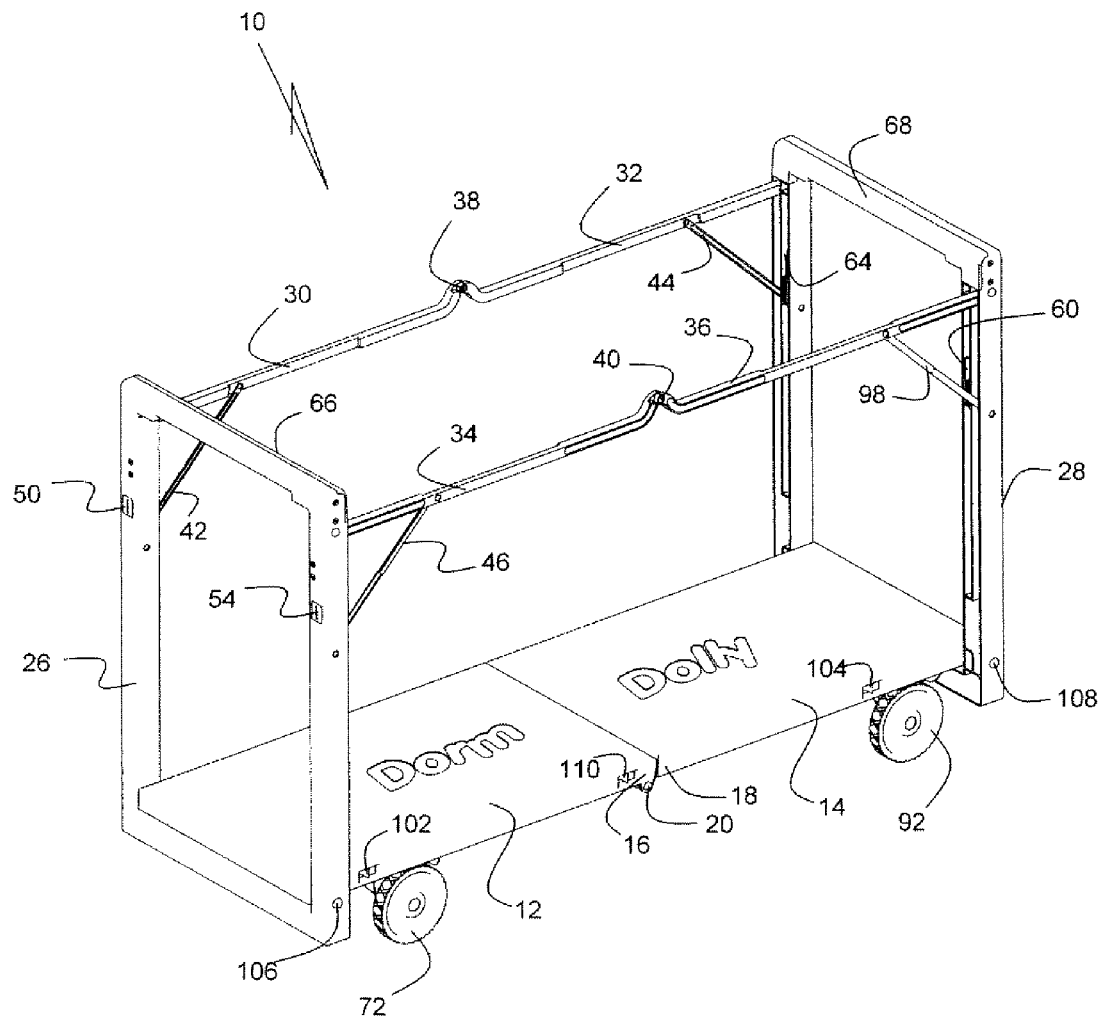
FIG. 1 is an isometric perspective view of the dolly assembly according to a preferred embodiment of the present inventions and not illustrating the optional provision of side (e.g. mesh or netting) supports.
Figure 2:
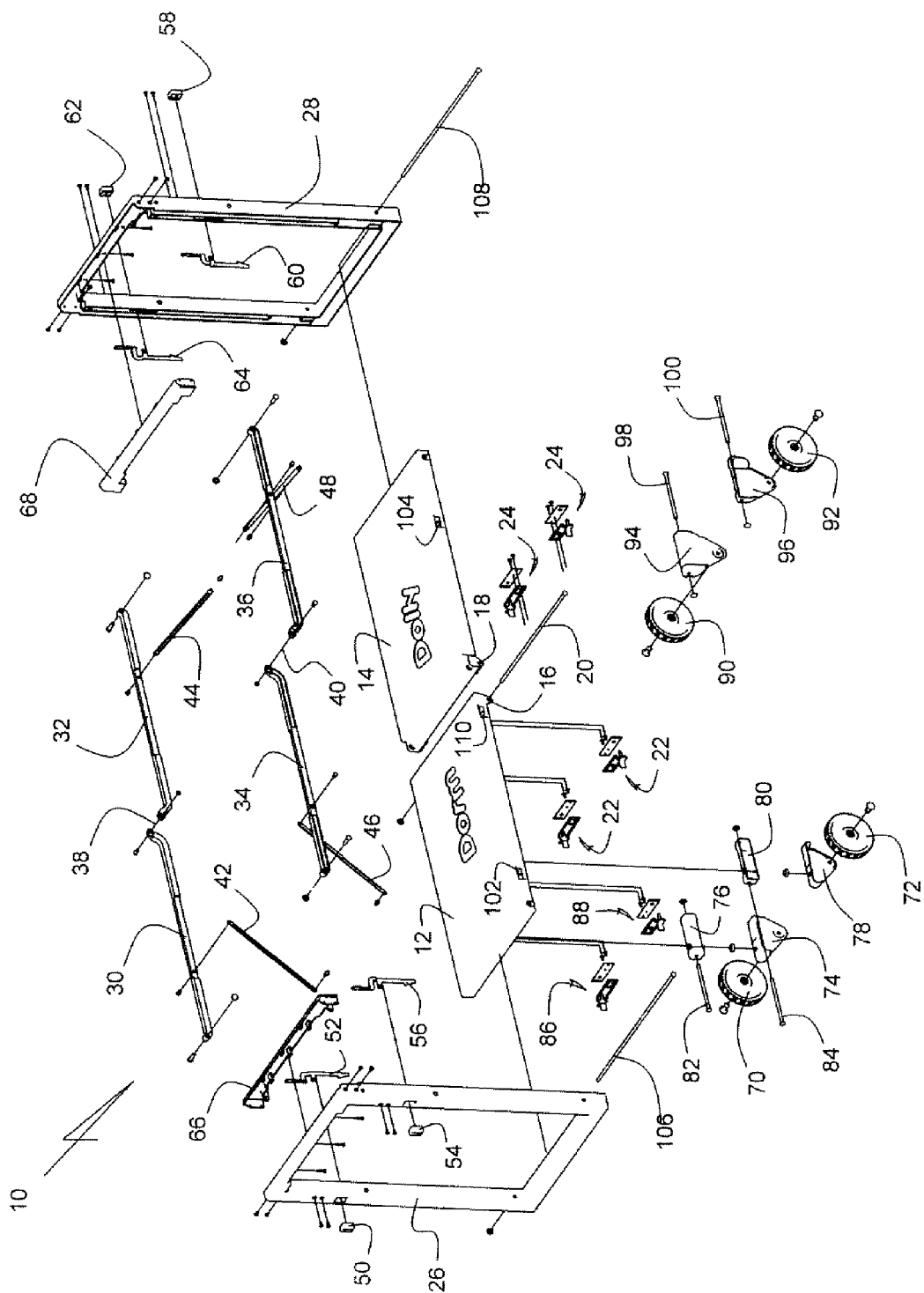
FIG. 2 is an exploded view of the dolly assembly as illustrated in FIG. 1.

Referring now to FIGS. 1 and 2, respective isometric and exploded perspective views are illustrated generally at 10 of the foldable/convertible dolly assembly according to the present invention. As stated previously the dolly 10 shown in FIGS. 1 and 2 does not illustrate the optional provision of side (e.g. mesh or netting) supports, this being further, illustrated and described in reference to the dolly as shown in the corresponding exploded views of FIGS. 28 and 29 as will be subsequently described.

The construction of the dolly 10, as best illustrated in the exploded perspective of FIG. 2, is as generally follows and includes a pair of typically plastic or otherwise substantially rigid and planar shaped base portions 12 and 14 which are secured together at opposed hinged selected locations 16 and 18 (respectively) by a hinge support rod 20. Hinge lock assemblies, generally referenced at 22 and 24 and as will be further described in detail are provided at opposing ends of the rigid base portions 12 and 14, respectively, and to engage opposite ends of the hinge support rod 20 in selective locking or released positions.

A pair of rectangular, frame shaped end supports 26 and 28 are provided, each typically also formed of a plastic or other durable and lightweight material and which are secured in upwardly extending fashion from opposite end locations of the planar shaped base portions 12 and 14. First and second pairs 30 & 32 and 34 & 36 of top length extending brackets are provided and such that the respective pairs define hinged locations 38 and 40 therebetween. Additional angled brace supports are shown at 42, 44, 46 and 48 (each typically constructed of stainless steel or other suitable lightweight and strong material) extend respectively from opposite end locations of each of the top frame defining brackets 30, 32, 34 and 36, to a respective angled mounting location with a selected inner facing location of each of the frame shaped end supports 26 and 28.

Release mechanisms associated with each of the end supports 26 and 28 and which as will be described subsequently permit vertical sliding displacement of connecting locations of each of the associated brace supports 42, 44, 46 and 48) are illustrated, respectively, at 50 & 52 and 54 & 56 with respect to end support 26 and further at 58 & 60 and 62 & 64 with respect to end support 28. Inner top edge fascia covers are also illustrated at 66 and 68 and are provided in association with the top edge extending locations of the frame supports 26 and 28 and which hide a number of fastener receiving locations as shown in FIG. 2.

A first pair of combined rotatable and swivelable wheels are shown at 70 and 72, these being located in underside mounting fashion to a remote end of the rigid planar base portion 12. The wheels 70 and 72 are secured by housing portions 74 & 76 and 78 & 80, respectively, additional pins 82 and 84 being provided through associated housing supports 76 and 80 and which, in combination with corresponding lock pin assemblies 86 and 88 as will be further illustrated in additional detail, are actuated to inwardly rotate the wheels 70 and 72 to a stored position.

A pair of fixed wheels 90 and 92 are located in likewise underside mounting fashion to an opposite remote end of the rigid base portion 14 and are housed within modified support portions 94 and 96. A further pair of lock pins 98 and 100 are referenced and which, again in combination with release locks, of which a pair are illustrated at 102 and 104 defined in side extending locations of the rigid base supporting portions 12 and 14 in cooperation with selected rotated wheel 72 and fixed wheel 92, enable the fixed wheels 90 and 92 to be rotated inwardly to the stored position.

Also, additional end support pins are shown at 106 and 108 and which secure the remote ends of the rigid base portions 12 and 14 to corresponding bottom locations of the frame shaped end supports 26 and 28. A central release lock 110 is provided for pivotally folding the rigid base portions 19 and 14 inwardly against one another upon actuating the opposingly arrayed pairs of hinge portions 22 and 24.

Figure 6:
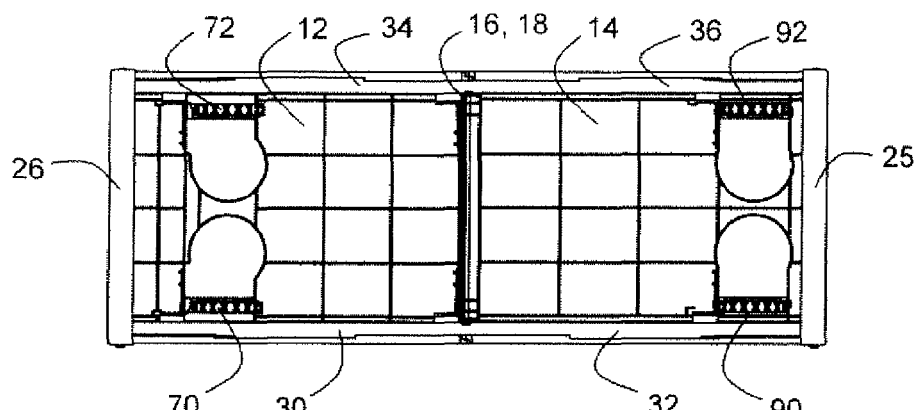
FIG. 6 is a bottom plan view of the present assembly.
Figure 7:
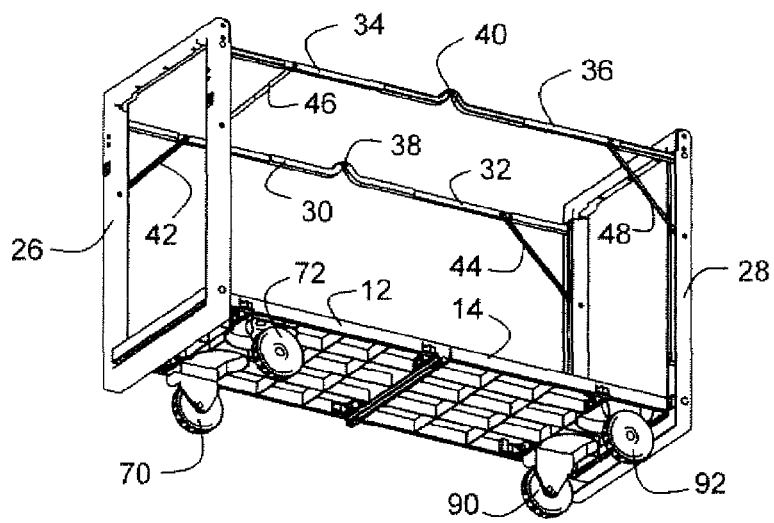
FIG. 7 is an isometric bottom perspective illustrating the dolly wheels extended.
Figure 8:
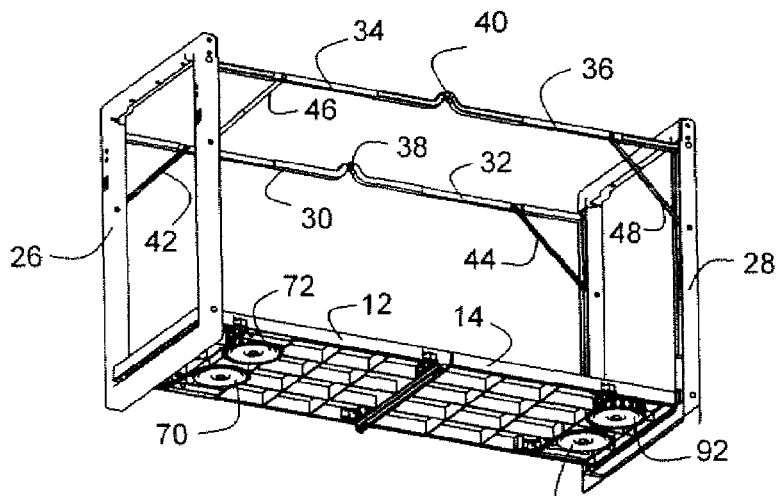
FIG. 8 is a corresponding isometric bottom view with the wheels folded.

Referring further to FIG. 6, a bottom plan view is shown in better detail of a honeycomb or other suitable injection forming shaping provided to the rigid plastic undersides of components 12 and 14 and which provide the desired degree of strength to the assembly. Also better illustrated is the recessed configuration of an underside wheel well associated with each of the rotatable 70 and 72 and fixed 90 and 92 wheels and which serves to provide a flush configuration when the wheels are rotated about their respective mounting pins 82 & 84 and 98 & 100, respectively, from the use position of FIG. 7 to the folded transport position, as illustrated in FIG. 8.

Figure 9:
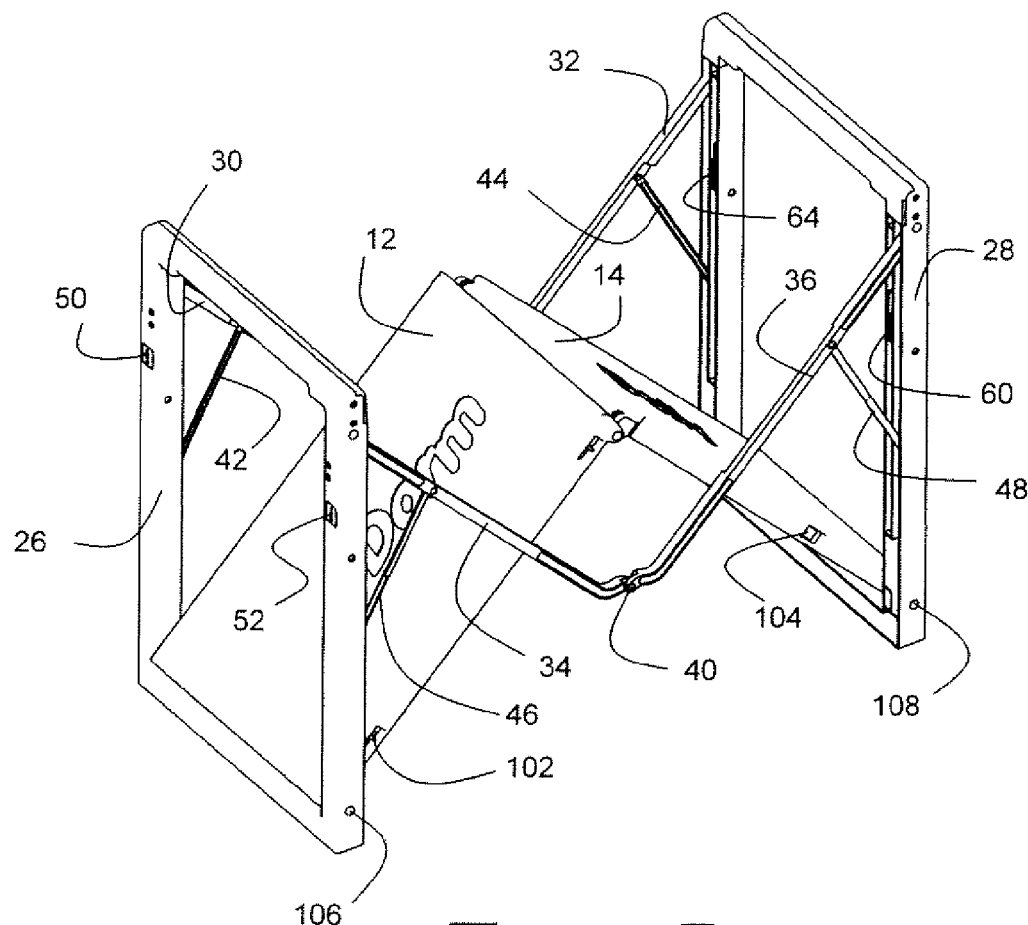
FIG. 9 illustrates a partially collapsed position of the assembly.
Figure 10:
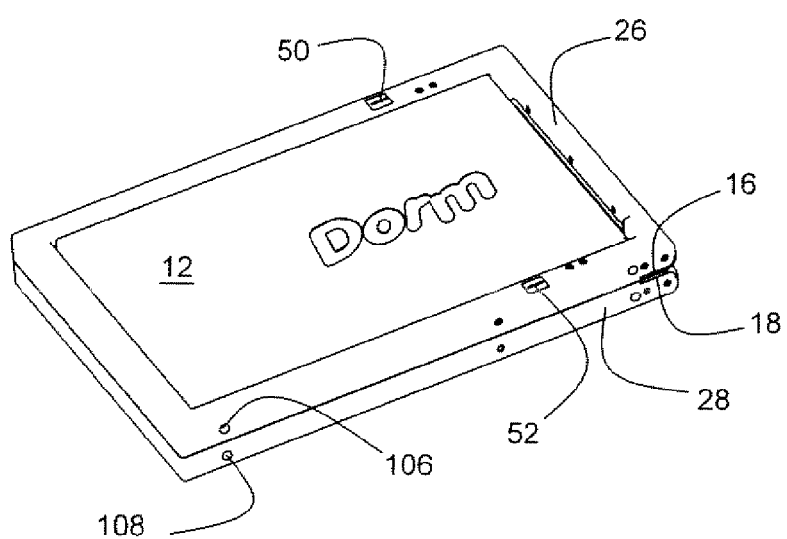
FIG. 10 is an illustration in perspective of the dolly in a totally collapsed and portable condition.
Figure 11:
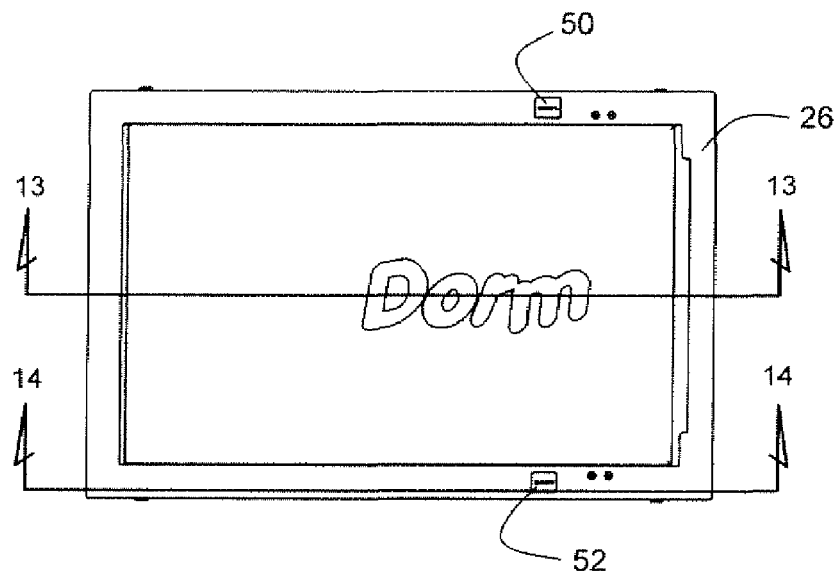
FIG. 11 is a top plan view of the collapsed dolly of FIG. 10.
Figure 12:
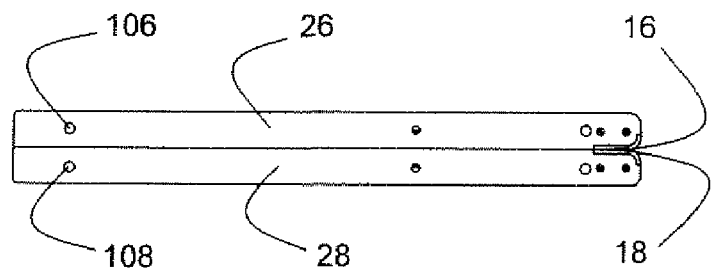
FIG. 12 is an end view of the collapsed dolly of FIG. 11.
Figure 13:
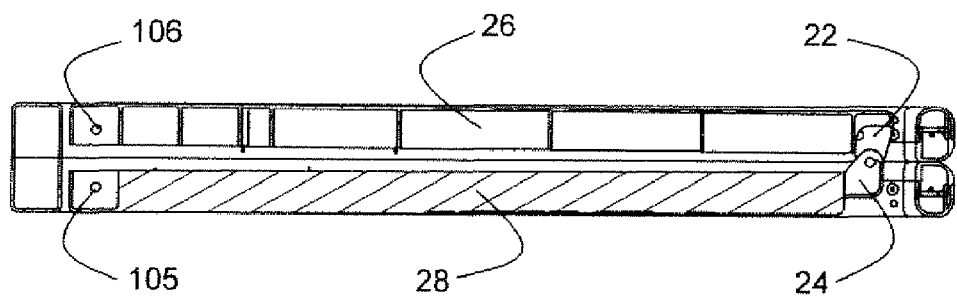
FIG. 13 is a cutaway view taken along line 13-13 of FIG. 11 and illustrating an exposed lengthwise extending center interior illustration of the collapsed dolly.

Referring now to FIG. 9, illustrated is a partially collapsed position of the assembly and by which the pairs of top frame defining brackets 30 & 32 and 34 & 36 are downwardly pivoted about central locations 38 and 40 (virtue of engaging release buttons 50, 54, 58 and 62 to allowing telescoping sliding of angled supports 42, 44, 46 and 48), in combination with the rigid bases 12 and 14 being inwardly and upwardly pivoted about its central hinged location 16 (by releasing lock pin 110), and in order to achieve the sandwiched arrangement of FIGS. 10-12 illustrating in perspective of the dolly in a totally collapsed and portable condition. FIG. 13 further illustrates a cutaway view taken along line 13-13 of FIG. 11 and illustrating an exposed lengthwise extending center interior illustration of the collapsed dolly.

Figure 14:
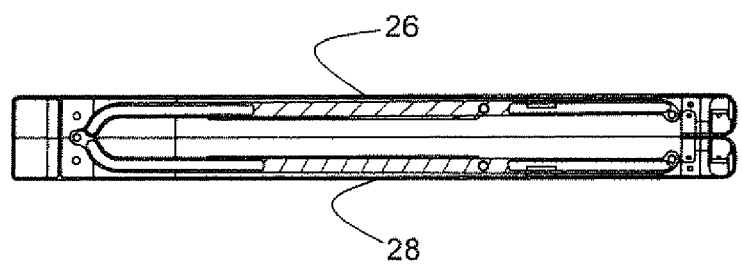
FIG. 14 is a cutaway view taken along line 14-14 of FIG. 11 and showing an exposed and lengthwise extending side rail illustration of the collapsed dolly.
Figure 15:
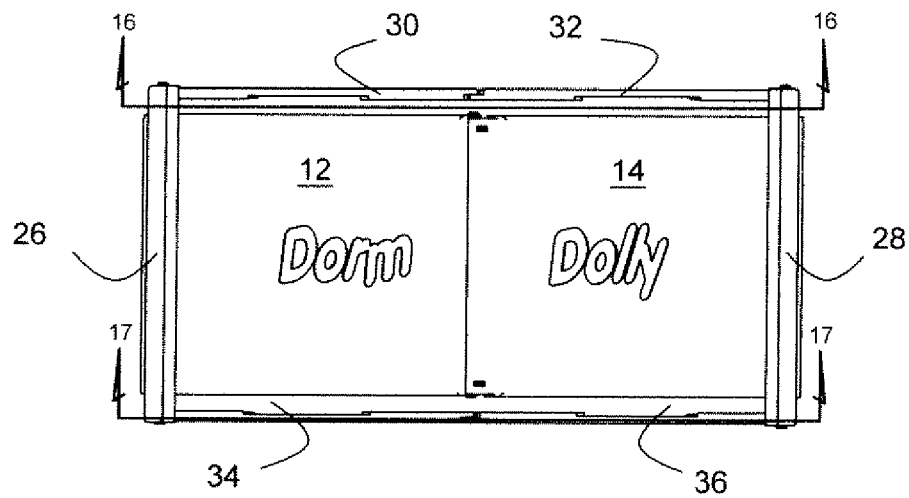
FIG. 15 is a top view of a partially collapsed dolly, such as shown in FIG. 9.

Referencing now FIG. 14, a cutaway view taken along line 14-14 of FIG. 11 shows an exposed and lengthwise extending side rail illustration of the collapsed and sandwiched dolly also shown in FIG. 10. FIG. 15 further shows a top view of a partially collapsed dolly, such as shown in FIG. 9.

Referencing now FIG. 6, a cutaway view take along line 16-16 of FIG. 15 illustrates the partially collapsed section through its top rail pivots in cooperative fashion with that shown in FIG. 9. In particular, the vertical slotted arrangement defined in the sides of the frame portions 26 and 28 are shown, see as shown at 112 and 114 for angled brackets 42 and 44, respectively, and which facilitate the downward and inward collapse of the pairs of top brackets (see as exemplified by hinged pair 30 and 32 in side plan illustration) in corresponding fashion to the upward and inward collapse of the rigid base portions 12 and 14.

Figure 16:
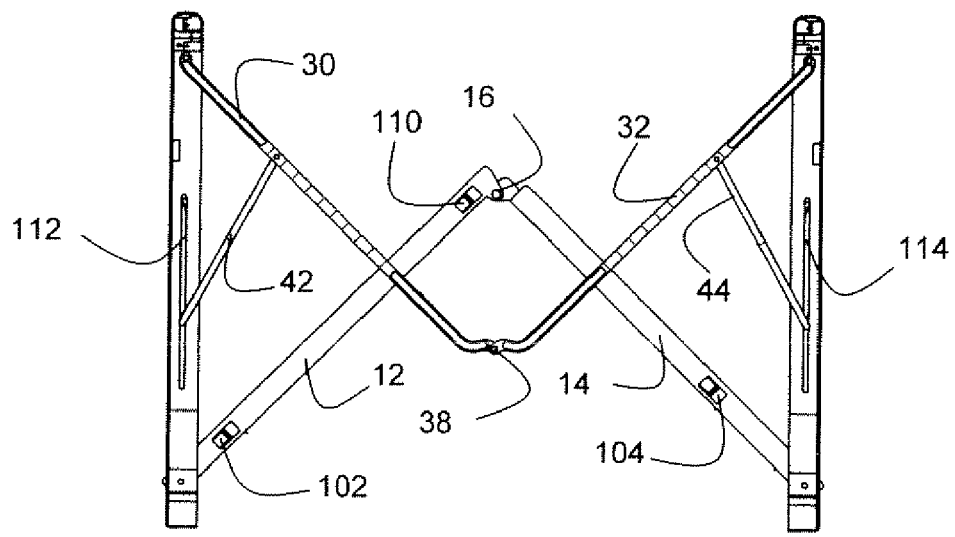
FIG. 16 is a cutaway view taken along line 16-16 of FIG. 15 and illustrating the partially collapsed section through its top rail pivots.
Figure 17:
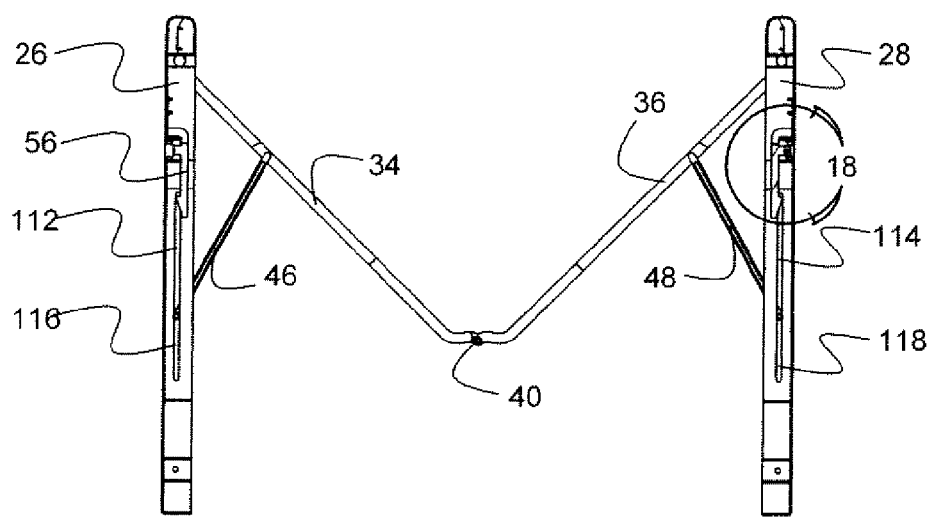
FIG. 17 is a further cutaway view taken along line 17-17 of FIG. 15 and illustrating the top rail lock mechanism in side cutaway and exposed fashion.

FIG. 17 is a further cutaway view taken along line 17-17 of FIG. 15, similar in nature to that shown in FIG. 16 and illustrates the top rail lock mechanism in side cutaway and exposed fashion in reference to the other pair of angled brackets 46 and 48 and associated pair 34 and 36 of hinged portions which traverse along additional vertical slots 116 and 118 in either of collapsing or opening directions.

Figure 18:
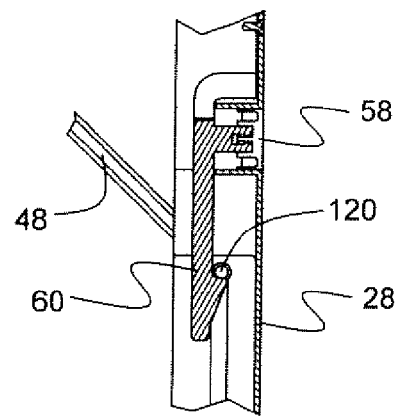
FIG. 18 is an enlarged partial view as illustrated in FIG. 17 of the top rail support bracket lock pin in an engaged position with the lock mechanism.
Figure 19:
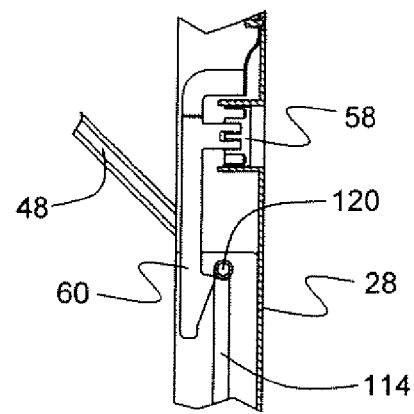
FIG. 19 is a successive illustration to that shown in FIG. 18 and of the lock pin in a second release position.
Figure 20:
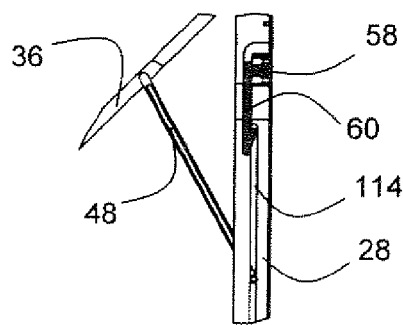
FIG. 20 is a further succeeding and partial illustration of the lock pin being advanced down a corresponding slot in the partially collapsed position.
Figure 27:
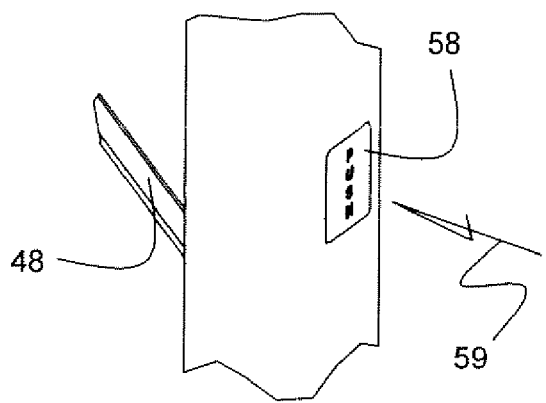
FIG. 27 is an enlarged partial isometric view illustration of a top rail lock mechanism release push button.

With reference to FIG. 18, an enlarged partial view is illustrated of a selected top rail support bracket lock pin and locking portion (see respectively at 58 and 60) selected from FIG. 17, and in an engaged position with the lock mechanism. FIG. 19 is a successive illustration to that shown in FIG. 18 and of the lock pin in a second release position and by virtue of the associated push button 58 being inwardly depressed, this causing the associated locking portion 60 to be inwardly displaced from a support ledge (see at 120) of selected angle bracket 48, whereby the bracket 48 is then permitted to progressively telescope (see FIG. 20) in advancing fashion down the corresponding slot in a collapsing direction. FIG. 27 is an enlarged partial isometric view illustration of a top rail lock mechanism release push button, see again at 58, and in order to release the selected illustrated, slidable and progressively telescoping bracket 48.

Figure 5:
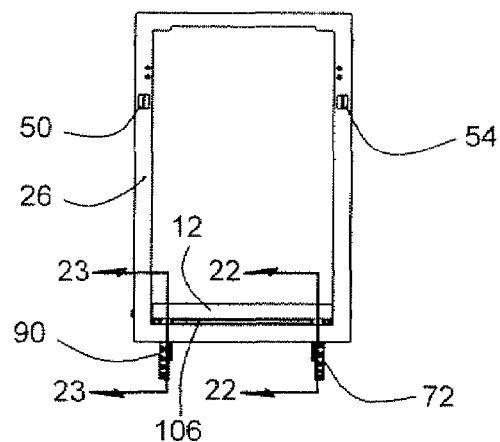
FIG. 5 is a selected end view of the present assembly.
Figure 21:
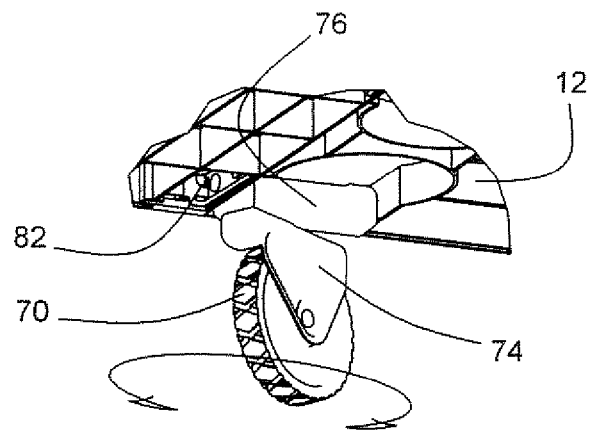
FIG. 21 is a bottom sectional perspective of a selected rotatable wheel in its use position.
Figure 22:
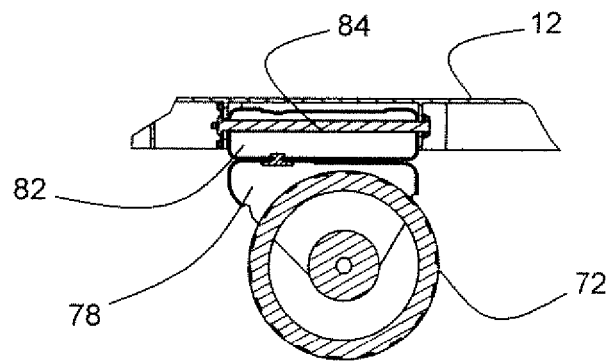
FIG. 22 is a cutaway illustration along line 22-22 of FIG. 5 of a rotatable wheel.
Figure 23:
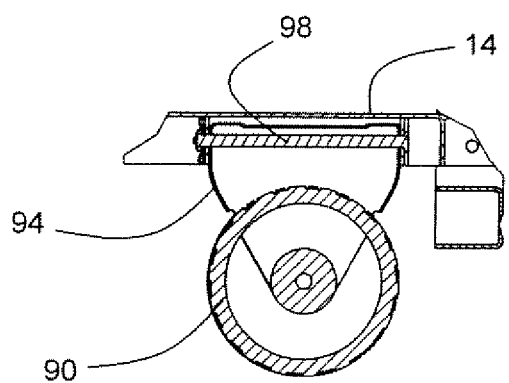
FIG. 23 is a further cutaway illustration along line 23-23 of FIG. 5 of a further selected fixed or stationary wheel.

FIG. 21 illustrates a bottom sectional perspective of a selected rotatable wheel 70 in its use position and as previously described. FIG. 22 illustrates is a cutaway illustration along line 22-22 of FIG. 5 of rotatable wheel 72, this providing an enhanced view of the manner in which the wheel 72 and its associated lousing portions 78 and 82 are rotated about the pin 84 engaged with the rigid support 12 underside. FIG. 23 is a further cutaway illustration taken along line 23-23 of FIG. 5, of a further selected fixed or stationary wheel, by example shown as non-swivelable wheel 90, and illustrating a similar arrangement by which a housing 94 and associated pin 98 are provided to rotate the wheel between the folded and use positions.

Figure 24:
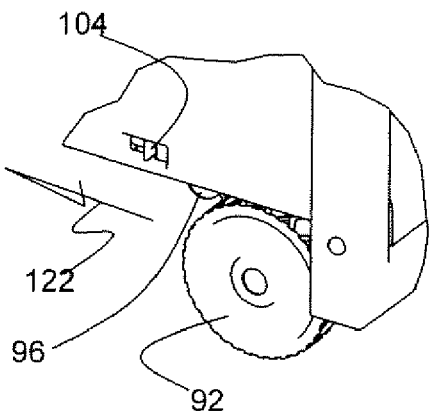
FIG. 24 is an isometric views of a stationary wheel fold lock release along an indicated arrow direction.

FIG. 24 is a further isometric view of a stationary wheel fold lock release, see for wheel 92, along an indicated arrow direction of 122 and in order to convert to a folded condition of the wheel. This is again accomplished by the release 104 working in cooperation with the pin support 100 to permit inward rotation of the wheel to the stored position.

Figure 25:
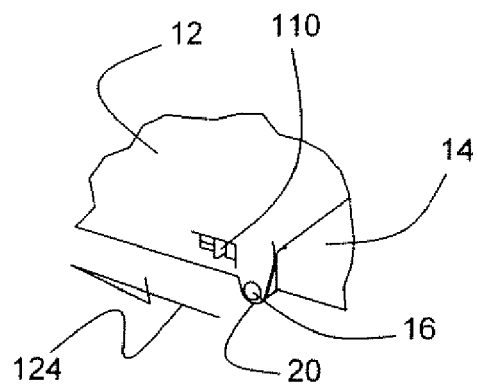
FIG. 25 is a further selected isometric view of a base located and center hinge lock release along a further indicated arrow direction.
Figure 26:
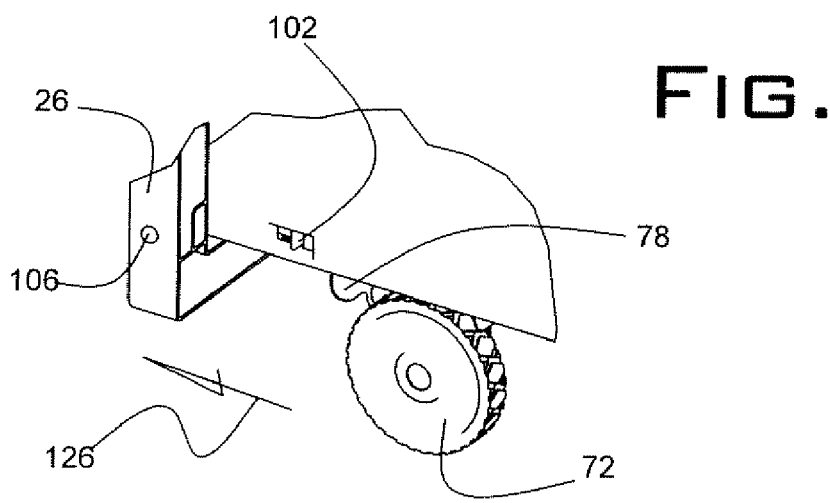
FIG. 26 is a further isometric view of a selected rotation wheel fold lock release along an indicated arrow direction.

FIG. 25 shows a further selected isometric view of the base located and center hinge lock release 110 along a further indicated arrow direction 124. Again, the rigid base sections 12 and 14 are allowed to converted to the folded position upon release of the lock release 110. As further shown in FIG. 26, a further isometric view of a selected rotation wheel fold lock release is indicated by arrow 124.

Figure 28:
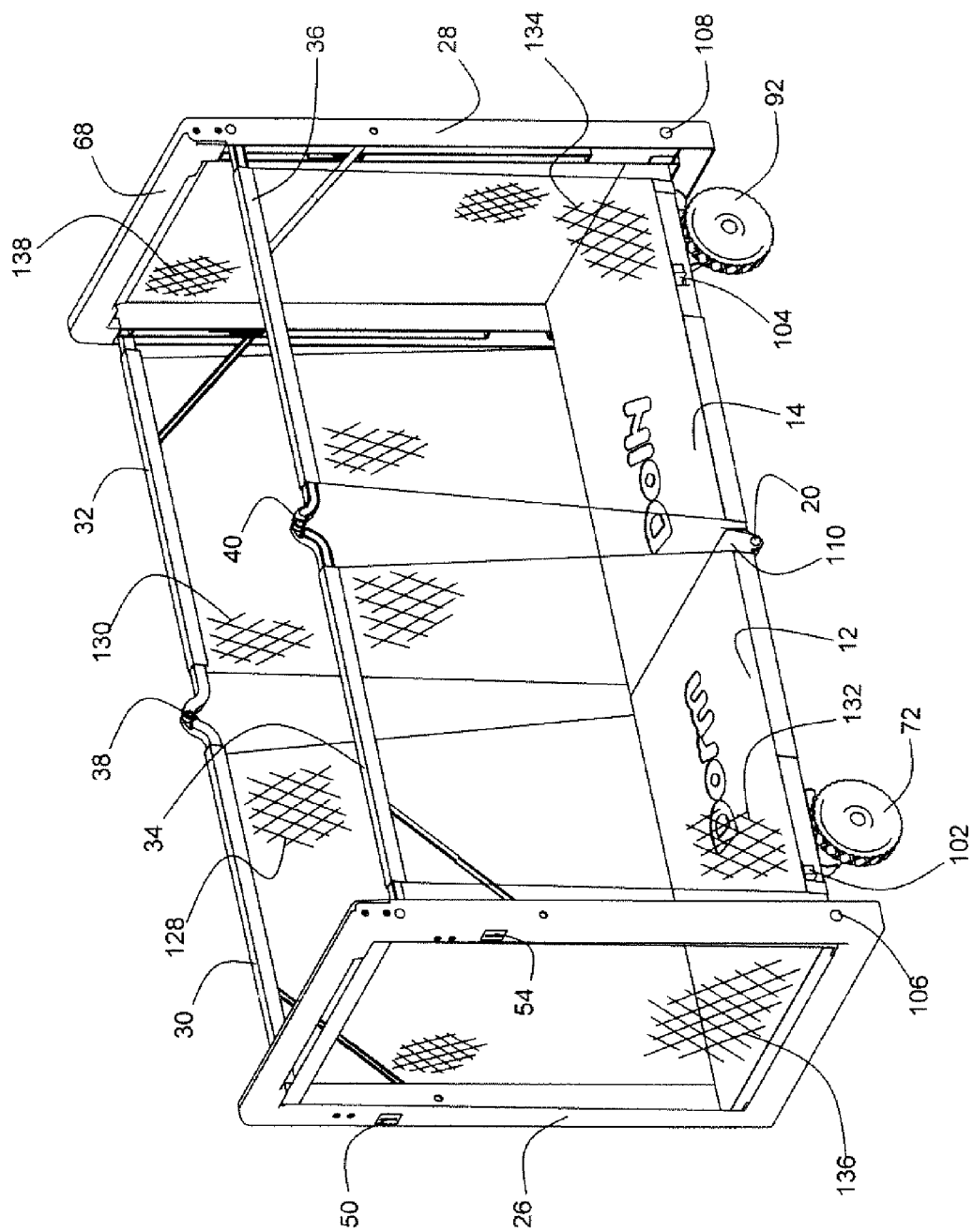
FIG. 28 is an isometric perspective of the dolly assembly as substantially shown in FIG. 1 and with side and end netting supports in place.
Figure 29:
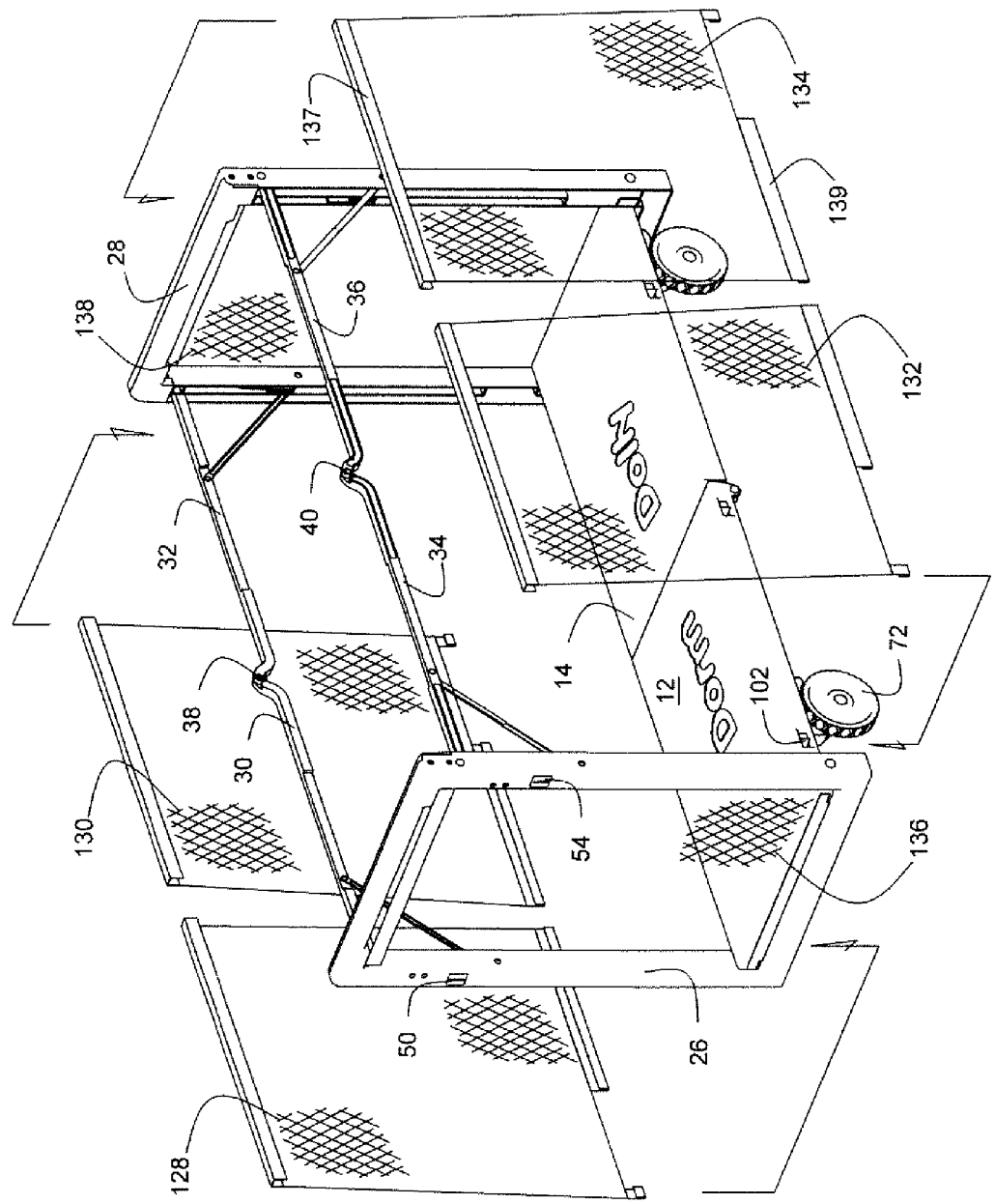
FIG. 29 is a partially exploded illustration of the netting supports illustrated in respect to the dolly of FIG. 28.

As previously referenced, FIG. 28 is an isometric perspective of the dolly assembly as substantially shown in FIG. 1 and with side 128, 130, 132 and 134 and end 136 and 138 netting supports illustrated in place. The mesh netting sections shown represent only one possible variant of side and end support and, as further referenced in the partially exploded illustration of FIG. 29, the side extending and attachable portions 128 & 130 and 132 & 134 may at least each include top and bottom located channels (e.g. at 137 and 139 for selected portion 134 in FIG. 29) for biasingly engaging to the tipper rails and rigid undersides of the dolly.

Figure 3:
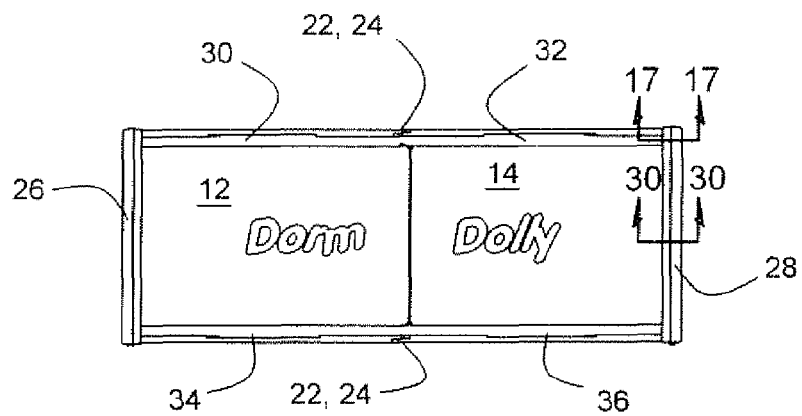
FIG. 3 is a top view of the present assembly.
Figure 30:
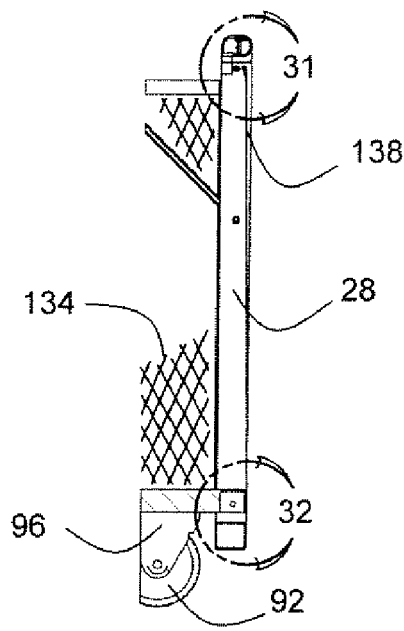
FIG. 30 is a cutaway view taken along line 30-30 of FIG. 3 and showing a sectional view through an associated end support and assembled end netting.
Figures 31, 32:
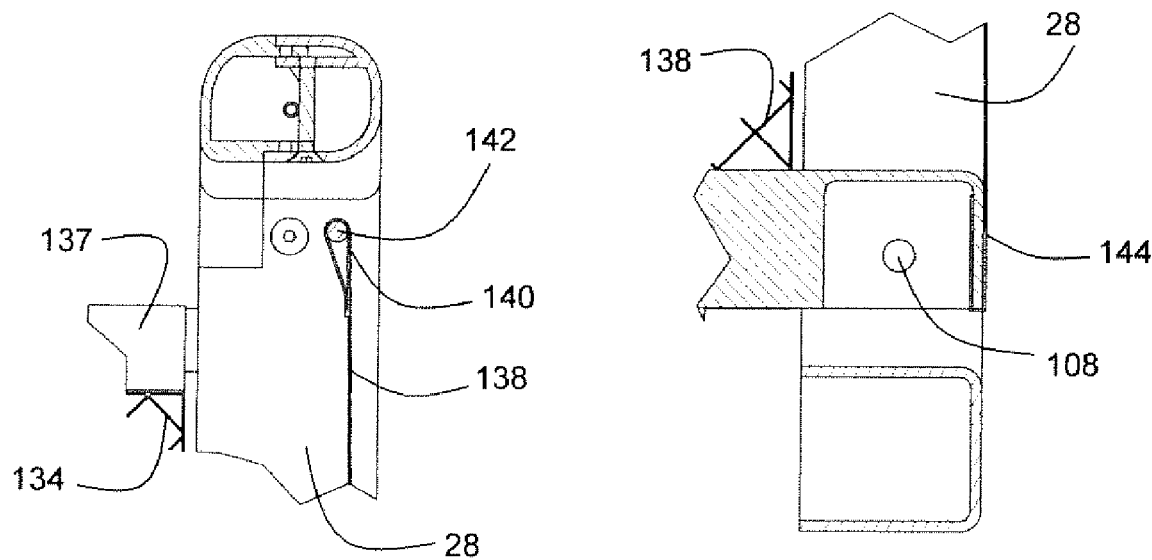
FIG. 31 is an enlarged illustration from FIG. 30 and showing the end netting at a top location with attachment rod.
FIG. 32 is a further enlarged illustration from FIG. 30 and showing the end netting at a bottom location associated hook attachment.

FIG. 30 is a cutaway view taken along line 30-30 of FIG. 3 and further showing a sectional view through a select associated end support netting 138. Referring further to FIG. 31, an enlarged illustration from FIG. 30 shows the selected end netting 138 at a top looped end 140 and support location an attachment rod 142. As further shown in FIG. 32, is a further enlarged illustration from FIG. 30 shows the end netting 138 at a bottom location associated hook attachment 144. (See also 139 in FIG. 20).

Figure 33:
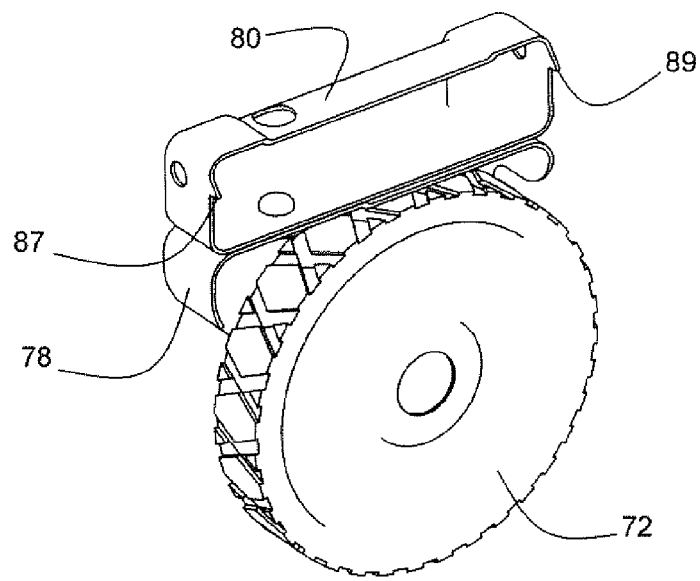
FIG. 33 is an isometric detail of a selected rotatable (swivelable) wheel.
Figure 34:
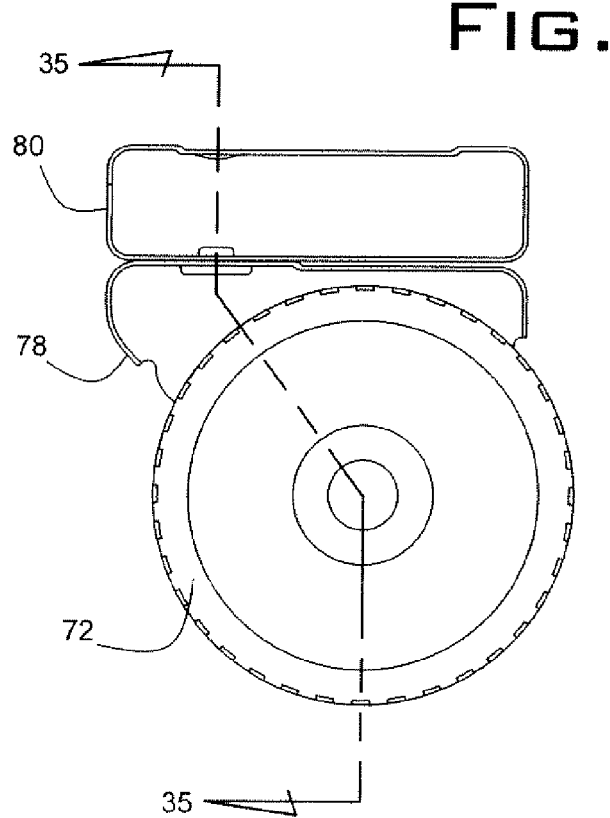
FIG. 34 is a side view of the rotatable wheel in FIG. 33.
Figure 35:
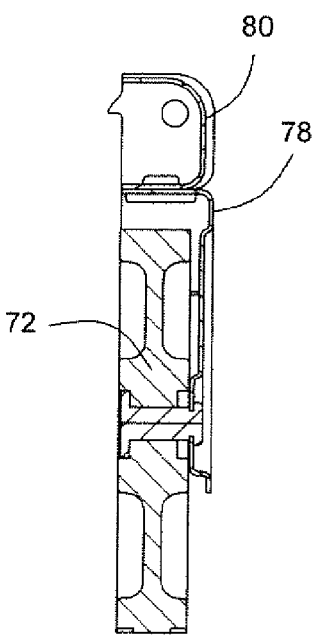
FIG. 35 is a cutaway view along interrupted line 35-35 of FIG. 34 and showing at sectional view of the rotatable wheel detail.

FIG. 33 is an isometric detail of a selected rotatable (swivelable) wheel, e.g. an enlarged illustration of the wheel assembly 72 described in FIG. 2. FIG. 34 is a side view of the rotatable wheel in FIG. 33 and FIG. 35 is a cutaway view along interrupted line 35-35 of FIG. 34 and showing a sectional view of the rotatable wheel detail.

Figure 36:
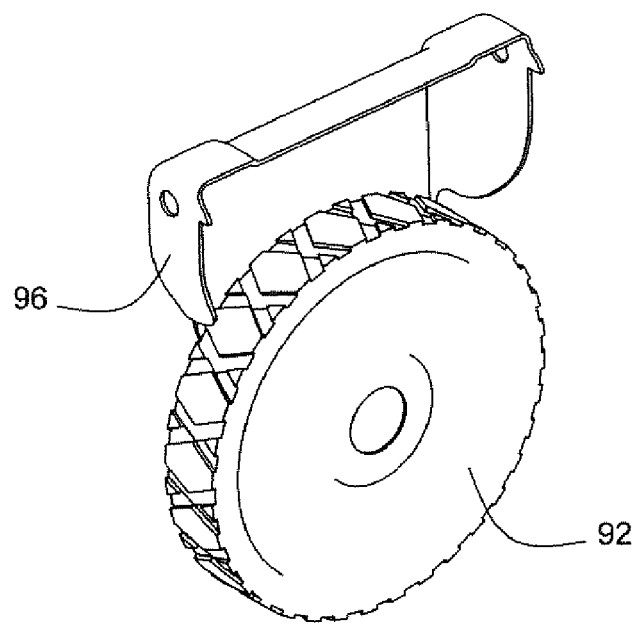
FIG. 36 is a sectional isometric view of a stationary wheel.
Figure 37:
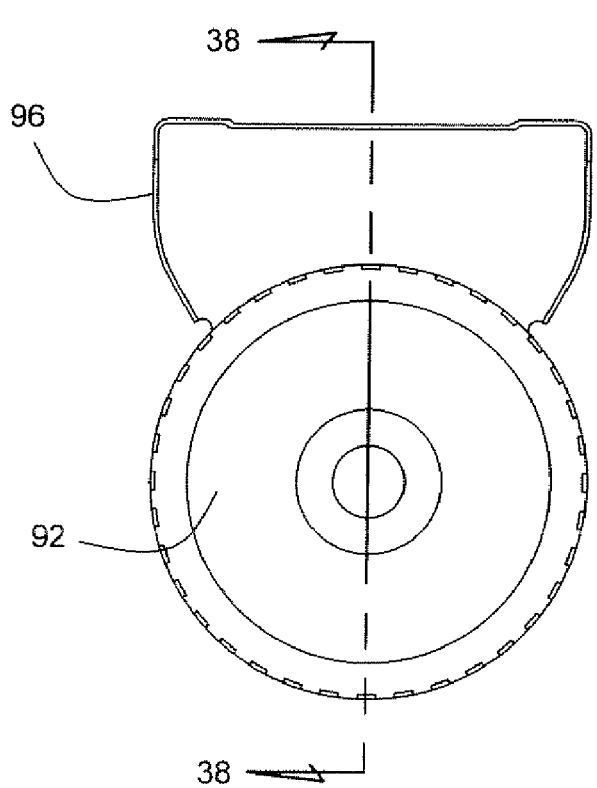
FIG. 37 is a side view of the stationary wheel detail of FIG. 36.
Figure 38:
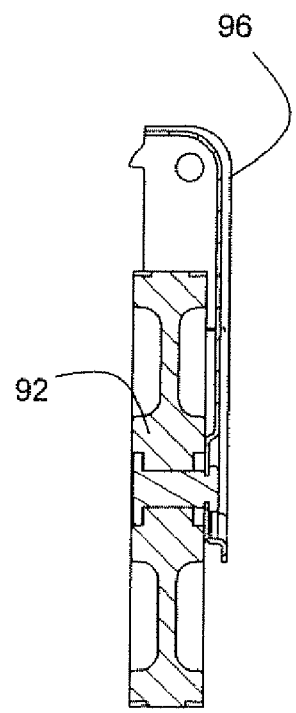
FIG. 38 is a cutaway view along line 38-38 of FIG. 37 and showing, the stationary wheel detail.

FIG. 36 is a sectional isometric view of a stationary wheel such as correspondingly previously illustrated at 92 in FIG. 2. FIG. 37 is a side view of the stationary wheel detail 92 of FIG. 36 and FIG. 38 is a cutaway view along line 38-38 of FIG. 37 and shaving the stationary wheel detail.

Figure 39:
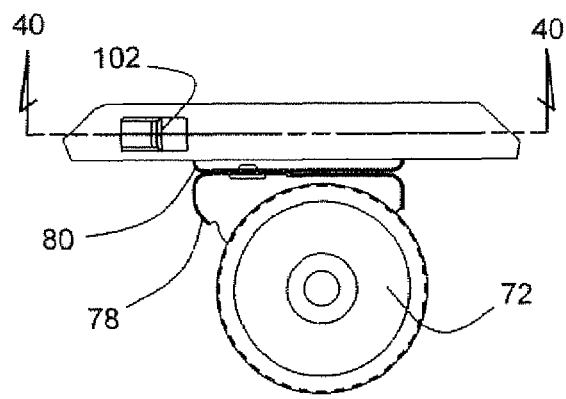
FIG. 39 is a side view detail of a rotatable wheel and lock release.
Figure 40:
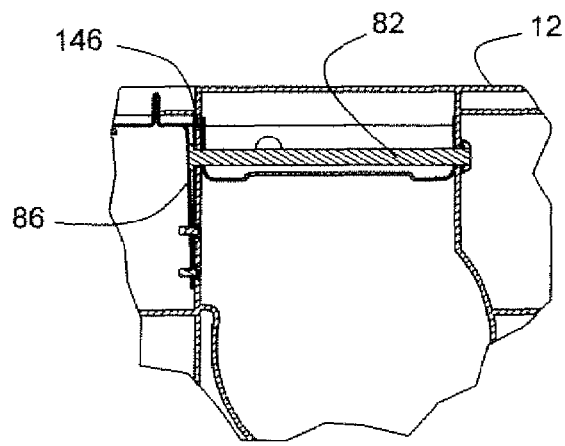
FIG. 40 is a cutaway view taken along line 40-40 of FIG. 39 and showing the wheel detail and fold lock in an engaged position.

FIG. 39 is a side view detail of a rotatable wheel and lock release as previously described at 72 in FIG. 2. FIG. 40 is a cutaway view taken along line 40-40 of FIG. 39 and showing the wheel detail and fold lock in an engaged position, as also previously illustrated and described in the isometric underside perspective of FIG. 8. Of particular note, the wheel is removed from this view and to better show the interplay between the selected wheel release lock 86 and the associated rotating pin 82.

Figure 4:
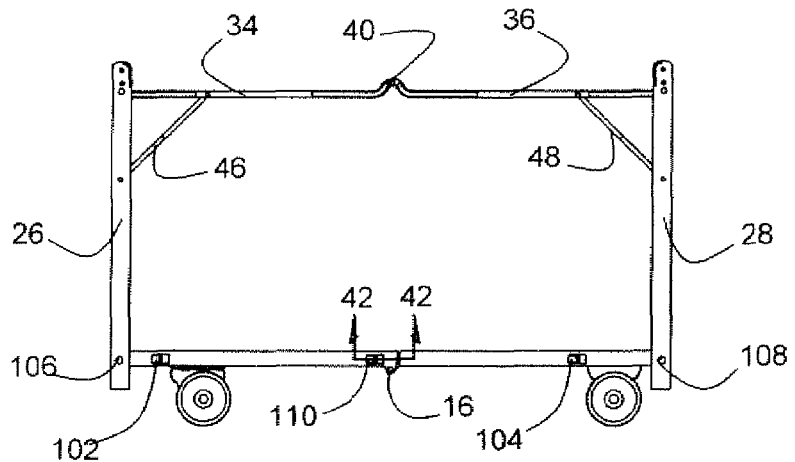
FIG. 4 is a side plan view of the present assembly.
Figure 41:
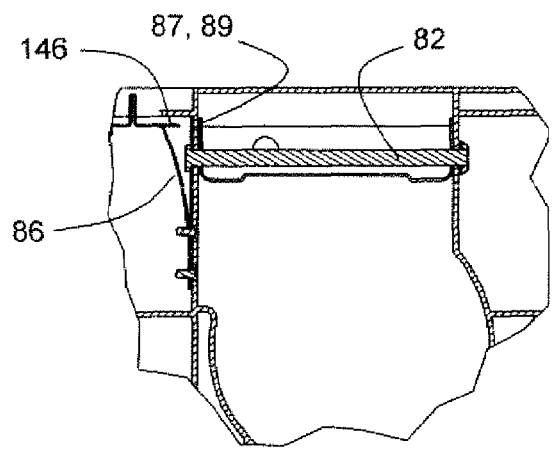
FIG. 41 is a sectional view illustration of the wheel detail of FIG. 40 and in particular of the fold lock in a released position.
Figure 42:
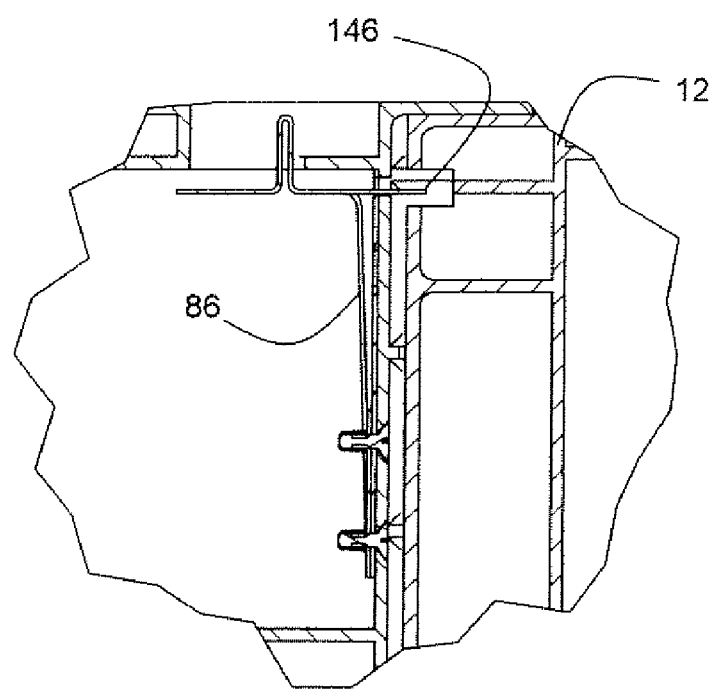
FIG. 42 is a yet further sectional view taken line 42-42 of FIG. 4 and illustrating the base center fold hinge lock (established between the two pivoting planar shaped bases) in an engaged position.
Figure 43:
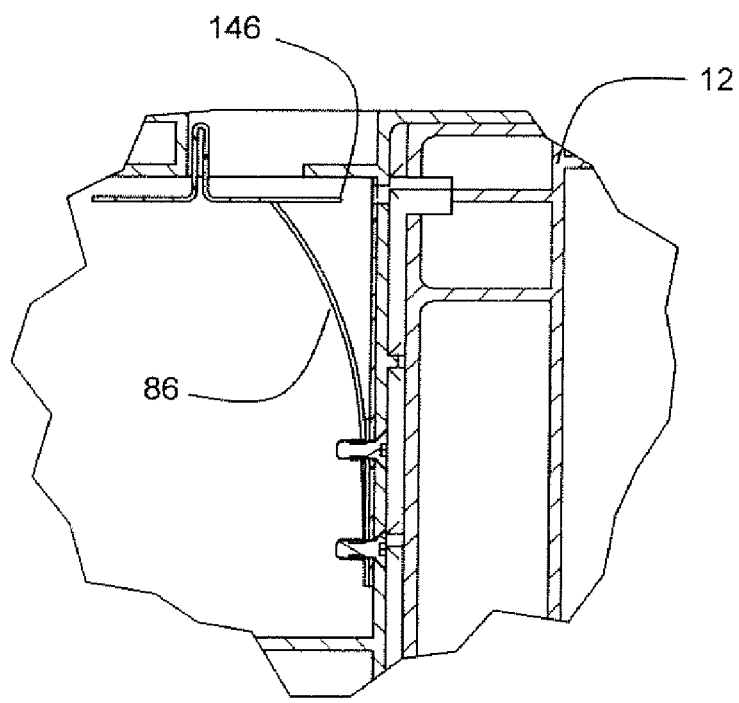
FIG. 43 is a further succeeding illustration of the base center fold hinge lock of FIG. 42 in a released and fold-permitting condition.

FIG. 41 further shows a sectional view illustration of the wheel detail of FIG. 40 and in particular of the fold lock in a released position. A pair of locking tabs see at 57 and 89, respectively interact with lockpin assemblies 86 and 88 (previously recited in FIG. 2) and upon engaging, prevent the wheel assembly from rotating relative to the base platforms 12 & 14. It is further that the feature described above is also incorporated into the rear fixed wheel assemblies 90 & 92. FIG. 42 is a yet further sectional view taken line 42-42 of FIG. 4 and better illustrates the base center fold hinge lock (established between the two pivoting planar shaped bases) in an engaged position. Reference in particular is made to the looped end portion associated with the selected spring biasing portion 86 of the wheel release. Finally, and referencing FIG. 43, a further succeeding illustration of the base center fold hinge lock of FIG. 42 is shown in a released and fold-permitting condition, this again being effectuated by the spring portion of release lock 86 being biased by actuation of the associated release 102 located in the side of the base portion (e.g. at 12), this further serving to unseat an inwardly projecting edge (see at 146 in each of FIGS. 40, 41, 42 and 43) from an associated receiving location associated with a rotatable wheel housing, thereby permitting the given fixed or rotatable wheel to be manually pivoted to the folded (or reopened) position.

Having described my invention, other and additional preferred embodiments will become apparent to those skilled in the art to which it pertains, and without deviating from the scope of the appended claims.

I claim:

1. A collapsible and transportable dolly, comprising:
   first and second rigid base portions hingedly secured together at a central location;
   first and second pairs of wheels securing to underside locations associated with said base portions;
   first and second substantially rectangular and frame shaped end supports secured in upwardly extending fashion to opposite end locations of said hingedly connected base portions; and
   first and second pairs of top brackets secured in interconnecting and hinged fashion between said end supports, associated angled bracket portions pivotally connected with and extending from end locations of each of said top brackets and engaging said end supports in vertically displacing fashion; said pairs of top brackets being downwardly pivoted about central locations corresponding with said hinge locations, by virtue of engaging release buttons associated with said end supports; said rigid
   base portions collapsing inwardly and upwardly with said central hinged location elevating above and between additional hinge locations associated with said pairs of length extending and inwardly collapsing brackets;
   said dolly being converted from a use to a portable folded storage/transport position in which said base portions are rotated to seat against and within a sandwiching arrangement established by said frame shaped end supports, concurrent with said pairs of top brackets inwardly telescoping and downwardly folding concurrent with said angled brackets vertically displacing along channels defined in said end supports and so that a collapsed area of the dolly equals that of each end support.

2. The dolly as described in claim 1, said first pair of wheels further comprising swivelable wheels secured to a first end of said dolly, whereas said second pair of wheel further comprising fixed wheels secured to a second end.

3. The dolly as described in claim 2, further comprising a lock release mechanism associated with each of said fixed and swivelable wheels and, in cooperation with a support pin associated with a wheel housing, permitting said wheels to convert between use and rotated storage positions within a selected base portion underside.

4. The dolly as described in claim 1, further comprising mesh netting sections secured to respective sides and ends of said assembled dolly enclosure.

5. The dolly as described in claim 1, each of said rigid base portions further comprising a rigid plasticized construction and being secured together at opposed hinged selected locations by a hinge support rod, hinge lock assemblies being provided at opposing ends of said base portions and engaging opposite ends of said hinge support rod in one of selective locking and released positions.

6. The dolly as described in claim 1, further comprising said angled brackets extending respectively from opposite end locations of each of said top brackets to a respective angled mounting location with a selected inner facing location of each of said frame shaped end supports.

7. The dolly as described in claim 1, further comprising end support pins are shown securing remote ends of said rigid base portions to corresponding bottom locations of said frame shaped end supports.

8. The dolly as described in claim 5, further comprising a central release lock pivotally folding said rigid base portions inwardly against one another, and upon actuating an opposingly arrayed pairs of hinge lock assemblies communicating with said hinge support rod.

9. The dolly as described in claim 6, further comprising a lock pin associated with a selected top rail bracket and engaged with a lock mechanism, said lock pin being actuated to a release position, upon depressing an associated push button, this causing an associated locking portion to be inwardly displaced from a support ledge of a selected angled brace support, whereby said top rail bracket is permitted to progressively telescope in advancing fashion a corresponding slot in a collapsing direction.

10. The dolly as described in claim 4, said mesh netting sections further comprising a select associated end support netting including a top looped end defining a support location to a horizontally extending attachment rod, a further end netting extending along at a bottom location and with a hook attachment.

11. The dolly as described in claim 1, further comprising inner top edge fascia covers provided in association with top edge extending locations of said frame support ends.

12. A collapsible and transportable dolly, comprising:
   a pair of rigid and planar shaped base portions which are hingedly secured together at a central location about a widthwise extending hinge support rod;

first and second pairs of wheels securing to underside locations associated with said base portions;

first and second substantially rectangular and frame shaped end supports secured in upwardly extending fashion to opposite end locations associated with said hingedly connected base portions;

first and second pairs of top brackets secured in interconnecting and hinged fashion between said end supports, further associated angled bracket portions pivotally connected with and extending from end locations of each of said top brackets and engaging said end supports;

said ridge base portions collapsing inwardly and upwardly with said hinge support rod elevating above and between additional hinge locations associated with said pairs of length extending and inwardly collapsing brackets; and said pairs of brackets being downwardly pivoted about central locations corresponding with said hinge locations, by virtue of engaging release buttons associated with said end supports, thereby allowing telescoping collapse of said brackets concurrent with sliding of said angled bracket portions along channels defined in said frame shaped end supports, and in combination with said base portions being inwardly and upwardly pivoted about said hinge support rod to rotate against said frame shaped end supports, via a separate release lock pin, and in order to convert said dolly to a sandwiched arrangement in a totally collapsed and portable condition and so that an area of the dolly equals that of each end support.

13. The dolly as described in claim 12, said first pair of wheels further comprising swivelable wheels secured to a first end of said dolly, whereas said second pair of wheel further comprising fixed wheels secured to a second end.

14. The dolly as described in claim 13, further comprising a lock release mechanism associated with each of said fixed and swivelable wheels and, in cooperation with a support pin associated with a wheel housing, permitting said wheels to convert between use and rotated storage positions within a selected base portion underside.

15. The dolly as described in claim 12, further comprising mesh netting sections secured to respective sides and ends of said assembled dolly enclosure.

16. The dolly as described in claim 12, further comprising end support pins are shown securing remote ends of said rigid base portions to corresponding bottom locations of said frame shaped end supports.

17. The dolly as described in claim 16, further comprising a central release lock pivotally folding said rigid base portions inwardly against one another, and upon actuating an opposingly arrayed pairs of hinge lock assemblies communicating with said hinge support rod.

18. The dolly as described in claim 17, further comprising a lock pin associated with a selected top rail bracket and engaged with a lock mechanism, said lock pin being actuated to a release position, upon depressing an associated push button, this causing an associated locking portion to be inwardly displaced from a support ledge of a selected angled brace support, whereby said top rail bracket is permitted to progressively telescope in advancing fashion a corresponding slot in a collapsing direction.

19. The dolly as described in claim 15, said mesh netting sections further comprising a select associated end support netting including a top looped end defining a support location to a horizontally extending attachment rod, a further end netting extending along at a bottom location and with a hook attachment.

20. The dolly as described in claim 12, further comprising inner top edge fascia covers provided in association with top edge extending locations of said frame support ends.

* * * * *

UNITED STATES PATENT AND TRADEMARK OFFICE
CERTIFICATE OF CORRECTION

| | | |
|---|---|---|
| PATENT NO. | : 7,731,221 B2 | Page 1 of 1 |
| APPLICATION NO. | : 11/843442 | |
| DATED | : June 8, 2010 | |
| INVENTOR(S) | : Suzan L. Bess | |

It is certified that error appears in the above-identified patent and that said Letters Patent is hereby corrected as shown below:

Column 3, line 26 - delete "views" and insert --view--
Column 5, line 15 - delete "19" and insert --12--
Column 9, line 12 - delete "ridge" and insert --rigid--

Signed and Sealed this
First Day of February, 2011

David J. Kappos
*Director of the United States Patent and Trademark Office*